(12) United States Patent
Yang (10) Patent No.: US 12,376,700 B2
(45) Date of Patent: Aug. 5, 2025

(54) MULTIFUNCTIONAL AIR FRYER

(71) Applicant: Min Yang, Foshan (CN)

(72) Inventor: Min Yang, Foshan (CN)

(*) Notice: Subject to any disclaimer, the term of this patent is extended or adjusted under 35 U.S.C. 154(b) by 0 days.

(21) Appl. No.: 19/012,394

(22) Filed: Jan. 7, 2025

(65) Prior Publication Data
US 2025/0143512 A1    May 8, 2025

Related U.S. Application Data

(63) Continuation of application No. PCT/CN2023/106845, filed on Jul. 11, 2023.

(30) Foreign Application Priority Data

Jul. 19, 2022 (CN) .......................... 202221867691.1

(51) Int. Cl.
*A47J 37/06* (2006.01)
*A47J 37/12* (2006.01)

(52) U.S. Cl.
CPC ....... *A47J 37/0641* (2013.01); *A47J 37/1209* (2013.01)

(58) Field of Classification Search
CPC .......................... A47J 37/0641; A47J 37/1209
See application file for complete search history.

(56) References Cited

U.S. PATENT DOCUMENTS

2022/0397284 A1* 12/2022 Kim ...................... F24C 15/02

FOREIGN PATENT DOCUMENTS

| CN | 112438620 A | 3/2021 |
|---|---|---|
| CN | 112932280 A | 6/2021 |
| CN | 113475951 A | 10/2021 |
| CN | 216628273 U | * 5/2022 |
| CN | 218128172 U | 12/2022 |
| CN | 218246899 U | 1/2023 |
| CN | 219109219 U | 6/2023 |

OTHER PUBLICATIONS

CN216628273U—translation (Year: 2025).*
Google search (Year: 2025).*
IP.com search history (Year: 2025).*

* cited by examiner

*Primary Examiner* — Elizabeth M Kerr
*Assistant Examiner* — Keith Brian Assante
(74) *Attorney, Agent, or Firm* — Nitin Kaushik (57) ABSTRACT

The present invention relates to the technical field of household appliances. Provided is a multifunctional air fryer. In the air fryer, when a heating tube of a heating assembly faces downwards, a pot such as a fryer is placed between the heating tube and a base, a food product is placed in the fryer, and the heating tube emits heat to fry the food product in the fryer, thereby achieving a fryer function; and since the heating assembly is rotatably connected to a rotating assembly and a supporting rod is fixedly connected to the rotating assembly, when the heating assembly rotates the heating tube to face upwards by means of the rotating assembly, a pot such as a frying pan is placed on the heating tube, a food product is placed in the frying pan.

9 Claims, 12 Drawing Sheets

MULTIFUNCTIONAL AIR FRYER

CROSS-REFERENCE TO RELATED APPLICATIONS

The application claims priority to Chinese patent application No. 202221867691.1, filed on Jul. 19, 2022, the entire contents of which are incorporated herein by reference.

TECHNICAL FIELD

The present invention belongs to the technical field of household appliances, and in particular relates to a multifunctional air fryer.

BACKGROUND

The principle of the air fryer, which is relatively popular on the market now, is that the air heated by the built-in heating element in an enclosed space forms a circulating hot air vortex by means of a high-power fan, so that the heat can fully contact with the food surface and achieve the effect of pan-frying or deep-frying. Its advantages are as follows: The moisture and grease inside the food are taken away by fast-circulating hot air, and a golden crisp is formed on the surface of the food without adding or adding less oil to achieve the appearance and taste of pan-frying or deep-frying. Its advantages such as lower grease, better taste and being healthier are deeply loved by people.

However, the traditional air fryer is single in structure. Except that the fryer can move separately, the upper and lower parts of the body are connected together and cannot be separated or rotated, which makes it difficult to realize frying and baking (boiling) at the same time, making it very limited. In addition to increasing the cost of purchasing kitchen appliances, it cannot meet the diverse needs of users.

SUMMARY

Technical Problems

In view of this, in order to solve the problems in the prior art, the present invention provides a multifunctional air fryer. The technical problem to be solved by the present invention is how to realize functions such as pan-frying, deep-frying and boiling in the same fryer.

Technical Solutions

The present invention solves the above problems by the following technical means:

A multifunctional air fryer, comprising:
a heating assembly, wherein the heating assembly comprises a fryer body and a heating tube, and the heating tube is installed on a surface of the fryer body;
a base, wherein the base is located below the heating assembly, and the base and the heating assembly are provided with supporting rods;
a rotating assembly, wherein the rotating assembly is installed between the supporting rod and the heating assembly, the heating assembly is rotatably connected to the rotating assembly, and the supporting rod is fixedly connected to the rotating assembly; and
a pot, wherein a pot can be placed between the heating assembly and the base when the heating tube of the heating assembly faces downwards; and a pot can be placed above the heating tube when the heating assembly rotates the heating tube upwards by means of the rotating assembly.

In the above-mentioned multifunctional air fryer, the rotating assembly comprises a case, a rotating module, a clamping module and a pressing bar module, and the rotating module, the clamping module and the pressing bar module are all installed in the case;
the rotating module comprises a connecting shaft, a rotating wheel and a rotating shaft, a plurality of slots are arranged on the periphery side of the rotating wheel, one end of the connecting shaft is fixedly connected with the rotating wheel, and the other end of the connecting shaft passes through the case and is fixedly connected with the fryer body;
the clamping module comprises a bottom rod, a first spring and a clamping block, wherein a sliding hole is arranged on the clamping block; one end of the bottom rod is fixed on the case, and the other end of the bottom rod is slidably connected in a sliding hole; a clamp is arranged on the clamping block, and the clamp is clamped on the slot, the first spring passes through the bottom rod, one end of the first spring abuts against the case, and the other end of the first spring abuts against a lower side surface of the clamping block; raised parts are arranged on both sides of the clamping block; and
the pressing bar module comprises a bearing platform, a pressing bar, a connecting rod, a second spring and a connecting block; the bearing platform is fixed in the case, a through hole is arranged on the case, a cylindrical hole is arranged in the pressing bar, one end of the connecting rod is fixed on the bearing platform, and the other end of the connecting rod extends into the cylindrical hole and is slidably connected with the pressing bar, the second spring passes through the connecting rod, one end of the second spring abuts against the bearing platform, and the other end of the second spring abuts against a bottom of the pressing bar; the connecting block is located in the case and fixedly connected to the pressing bar, and both ends of the connecting block are provided with ejector rods corresponding to the raised parts.

In the above-mentioned multifunctional air fryer, the first spring and the second spring are both springs compressed.

In the above-mentioned multifunctional air fryer, the heating assembly further comprises a housing, a top cover and a mounting base; the mounting base is installed in the housing; the mounting base is used for installing electrical appliance control components; the heating tube is installed on the mounting base; the top cover is fixed on a surface of the housing away from the heating tube.

In the above-mentioned multifunctional air fryer, the housing is provided with an air outlet.

In the above-mentioned multifunctional air fryer, the pot is a fryer; when the heating tube of the heating assembly faces downwards, the fryer is placed between the fryer body and the base for deep-frying food.

In the above-mentioned multifunctional air fryer, the material of the fryer is metal or tempered glass.

In the above-mentioned multifunctional air fryer, the fryer is provided with a handle.

In the above-mentioned multifunctional air fryer, the pot is a frying pan; when the heating assembly rotates the heating tube upwards by means of the rotating assembly, the frying pan is placed on the heating tube for decocting and boiling food.

In the above-mentioned multifunctional air fryer, the housing is provided with a plurality of jacks, a bottom of the frying pan is provided with a plurality of plug rods corresponding to the jacks, and the frying pan is plugged into the jacks of the housing by means of the plug rods.

Beneficial Effects

In the air fryer, when a heating tube of a heating assembly faces downwards, a pot such as a fryer is placed between the heating tube and a base, a food product is placed in the fryer, and the heating tube emits heat to fry the food product in the fryer, thereby achieving a fryer function; and since the heating assembly is rotatably connected to a rotating assembly and a supporting rod is fixedly connected to the rotating assembly, when the heating assembly rotates the heating tube to face upwards by means of the rotating assembly, a pot such as a frying pan is placed on the heating tube, a food product is placed in the frying pan, and the heating tube emits heat to decoct and boil the food product in the frying pan, decocting and boiling by means of the rotating assembly and different pots, that is, multiple functions are integrated, and the requirement of a user for one machine having multiple functions is met.

In the figures, 1. heating assembly; 2. fryer body; 3. heating tube; 4. base; 5. supporting rod; 7. rotating assembly; 8. case; 9. rotating module; 10. clamping module; 11. pressing bar module; 12. connecting shaft; 13. rotating wheel; 14. rotating shaft; 15. slot; 16. bottom rod; 17. first spring; 18. clamping block; 19. clamp; 20. raised part; 21. bearing platform; 22. pressing bar; 23. connecting rod; 24. second spring; 25. connecting block; 26. ejector rod; 27. housing; 28. top cover; 29. mounting base; 30. air outlet; 31. fryer; 32. handle; 33. frying pan; 34. jack; 35. plug rod.

DETAILED DESCRIPTION OF THE EMBODIMENTS

The following are specific embodiments of the present invention and further describe the technical solutions of the present invention in combination with the drawings, but the present invention is not limited to these embodiments.

As shown in FIGS. 1-6, the air fryer comprises: a heating assembly 1, a base 4, a rotating assembly 7 and a pot, wherein the heating assembly 1 comprises a fryer body 2 and a heating tube 3, and the heating tube 3 is installed on a surface of the fryer body 2; the base 4 is located below the heating assembly 1, and the base 4 and the heating assembly 1 are provided with supporting rods 5. The rotating assembly 7 is installed between the supporting rod 5 and the heating assembly 1. The heating assembly 1 is rotatably connected to the rotating assembly 7, and the supporting rod 5 is fixedly connected to the rotating assembly 7. When the heating tube 3 of the heating assembly 1 faces downwards, the pot can be placed between the heating assembly 1 and the base 4. When the heating assembly 1 rotates the heating tube 3 upwards by means of the rotating assembly 7, the pot can be placed above the heating tube 3.

In the air fryer, the heating assembly 1 provides heat for pan-frying or deep-frying food, which comprises a fryer body 2 and a heating tube 3 installed on a surface of the fryer body 2. Base 4 is located under the heating assembly 1. When the heating tube 3 of heating assembly 1 faces downwards, i.e. the heating tube 3 is opposite to the base 4, at this moment, a pot such as fryer 31 is placed between the heating tube 3 and the base 4. A food product is placed in the fryer 31. The heating tube 3 emits heat to fry the food product in the fryer 31 to realize the function of the fryer 31. Since the heating assembly 1 is rotatably connected to the rotating assembly 7 and the supporting rod 5 is fixedly connected to the rotating assembly 7, when the heating assembly 1 rotates the heating tube 3 upwards by means of the rotating assembly 7, that is, the heating tube 3 is located above the fryer body 2, at this moment, a pot such as a frying pan 33 is placed on the heating tube 3, a food product is placed in the frying pan 33, and the heating tube 3 emits heat to pan-fry or boil the food in the frying pan 33, thus realizing a decocting and boiling function. The air fryer realizes multiple functions such as deep-frying, pan-frying and boiling by means of the rotating assembly 7 and different pots. That is to say, the multi-function integration meets the user's requirements of one machine for realizing multiple functions.

As shown in FIGS. 6-9, in this embodiment, the rotating assembly 7 comprises a case 8, a rotating module 9, a clamping module 10 and a pressing bar module 11; and the rotating module 9, the clamping module 10 and the pressing bar module 11 are all installed in the case 8. The rotating module 9 comprises a connecting shaft 12, a rotating wheel 13 and a rotating shaft 14; a plurality of slots 15 are arranged on the periphery side of the rotating wheel 13; one end of the connecting shaft 12 is fixedly connected with the rotating wheel 13, and the other end of the connecting shaft 12 passes through the case 8 and is fixedly connected with the fryer body 2. The clamping module 10 comprises a bottom rod 16, a first spring 17 and a clamping block 18; a sliding hole is arranged on the clamping block 18; one end of the bottom rod 16 is fixed on the case 8, and the other end of the bottom rod 16 is slidably connected in the sliding hole; a clamp 19 is arranged on the clamping block 18, and the clamp 19 is clamped on the slot 15; the first spring 17 passes through the bottom rod 16, one end of the first spring 17 abuts against the case 8, and the other end of the first spring 17 abuts against a lower surface of the clamping block 18; and raised parts 20 are arranged on both sides of the clamping block; the pressing bar module 11 comprises a bearing platform 21, a pressing bar 22, a connecting rod 23, a second spring 24 and a connecting block 25; the bearing platform 21 is fixed in the case 8 and a through hole is arranged on the case 8; a cylindrical hole is arranged in the pressing bar 22; one end of the connecting rod 23 is fixed on the bearing platform 21, and the other end of the connecting rod 23 extends into the cylindrical hole and is slidably connected to the pressing bar 22. The second spring 24 passes through the connecting rod 23, one end of the second spring 24 abuts against the bearing platform 21, and the other end of the second spring 24 abuts against a bottom of the pressing bar 22. The connecting block 25 is located in the case 8 and fixedly connected to the pressing bar 22. Both ends of the connecting block 25 are provided with ejector rods 26 corresponding to the raised parts 20. The first spring 17 and the second spring 24 are both springs compressed. In this mechanism, since the first spring 17 and the second spring 24 are both springs compressed, the first spring 17 pushes up against the clamping block 18, the clamp 19 on the clamping block 18 is clamped into the slot 15, and the fryer body 2 fixedly connected with the rotating wheel 13 is firmly fixed under the action of the clamp 19. At this moment, it can effectively ensure that when the air fryer is pan-frying or deep-frying food, the fryer body 2 is prevented from rotating. Safety accidents shall be prevented. When it is necessary to change the function of the air fryer, press down the pressing bar 22, and the pressing bar 22 drives the connecting block 25, and the ejector rod 26 on the connecting block 25 moves downwards with the pressing bar 22. Since the ejector rod 26 corresponds to the raised part 20, during the downward movement of the pressing bar 22, it contacts the raised part 20 and continues to push down the clamping block 18. During the downward movement of the clamping block 18, the clamp 19 on the clamping block 18 disengages from the slot 15. At this moment, the rotating wheel 13 is in a rotatable state, and then the fryer body 2 rotates 180°, that is, the heating tube 3 rotates downwards or upwards, so as to realize different functions.

Figure 10:
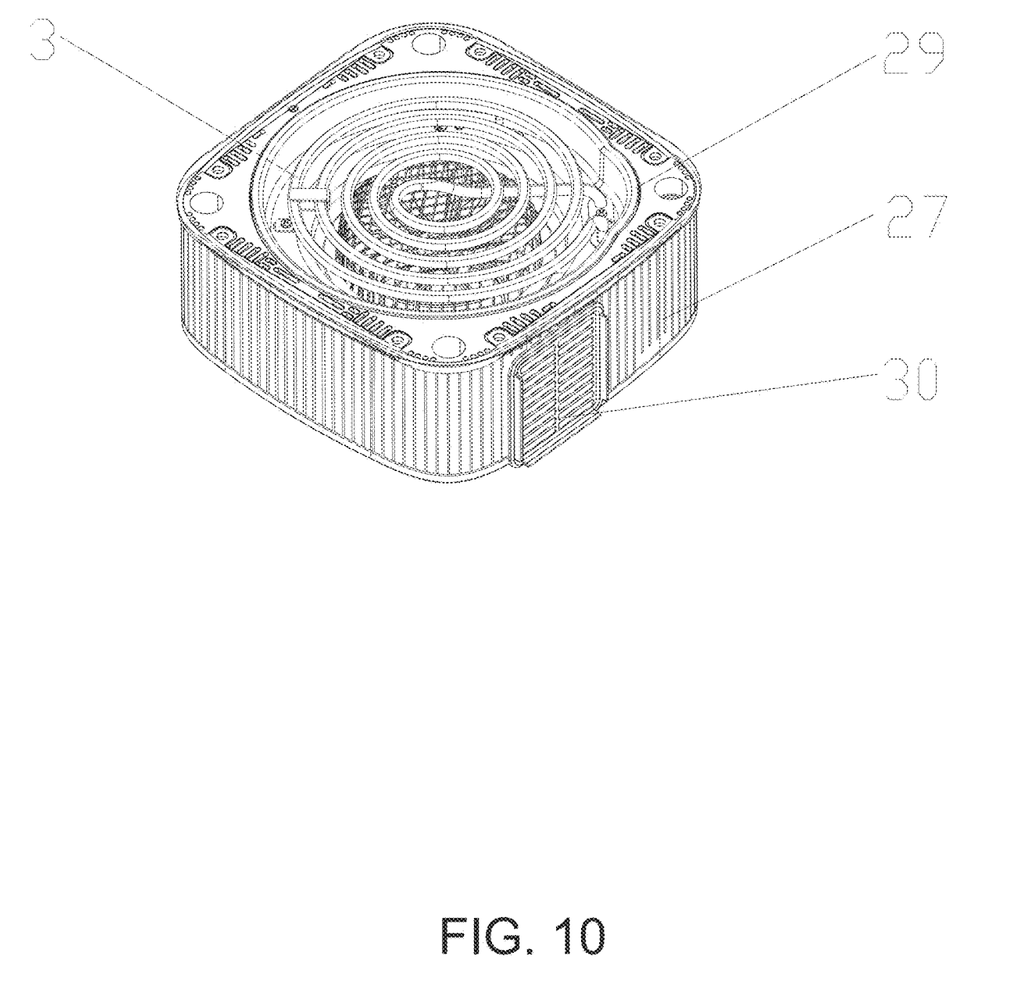
FIG. 10 is a structural schematic diagram of a heating assembly.
Figure 11:
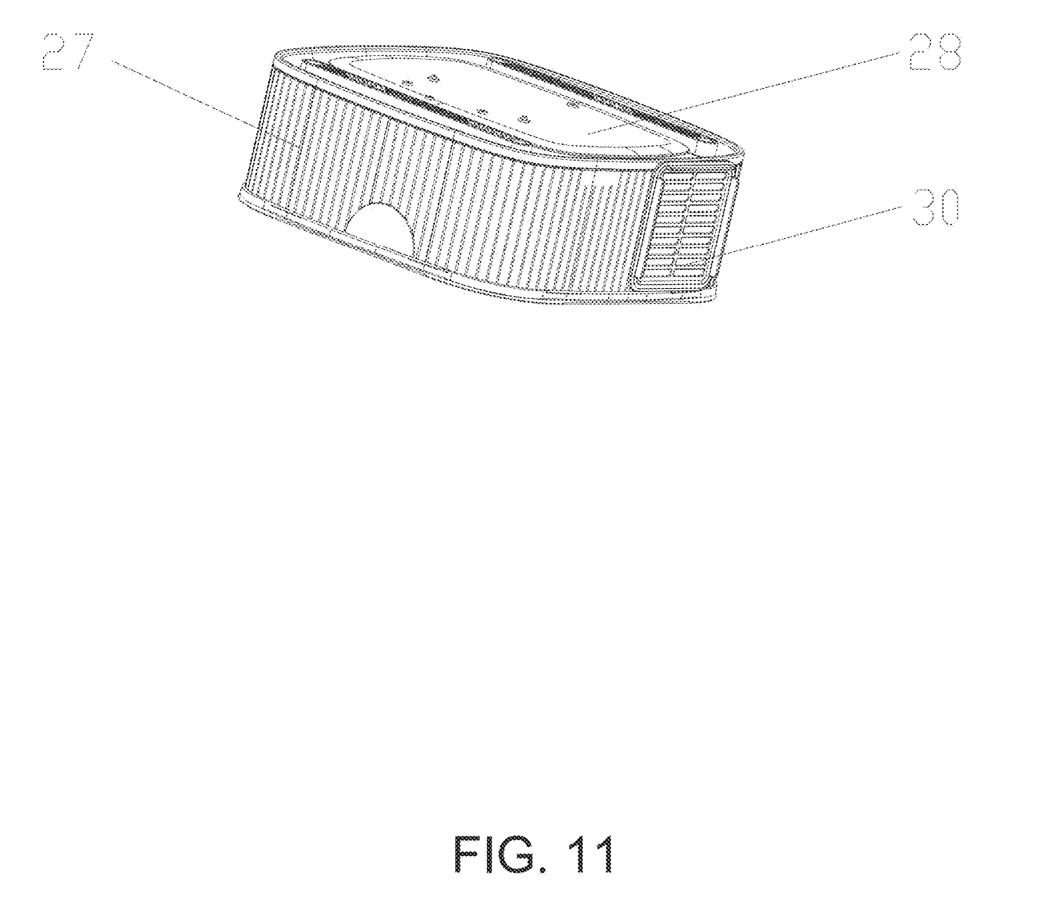
FIG. 11 is a structural schematic diagram of a heating assembly from another perspective.

As shown in FIGS. 10-11, in the embodiment, the heating assembly 1 further comprises a housing 27, a top cover 28 and a mounting base 29; the mounting base 29 is installed in the housing 27; the mounting base 29 is used for installing electrical appliance control components; the heating tube 3 is installed on the mounting base 29; the top cover 28 is fixed on a surface of the housing 27 away from the heating tube 3. In this structure, the mounting base 29 is configured to mount an electrical control component for controlling the operation of the heating tube 3 and adjusting the calorific value of the heating tube 3.

As shown in FIGS. 10-11, in this embodiment, the housing 27 is provided with an air outlet 30. In this structure, the housing 27 is provided with an air outlet 30 to dissipate heat in the housing 27 and protect electrical control components to operate safely.

Figure 1:
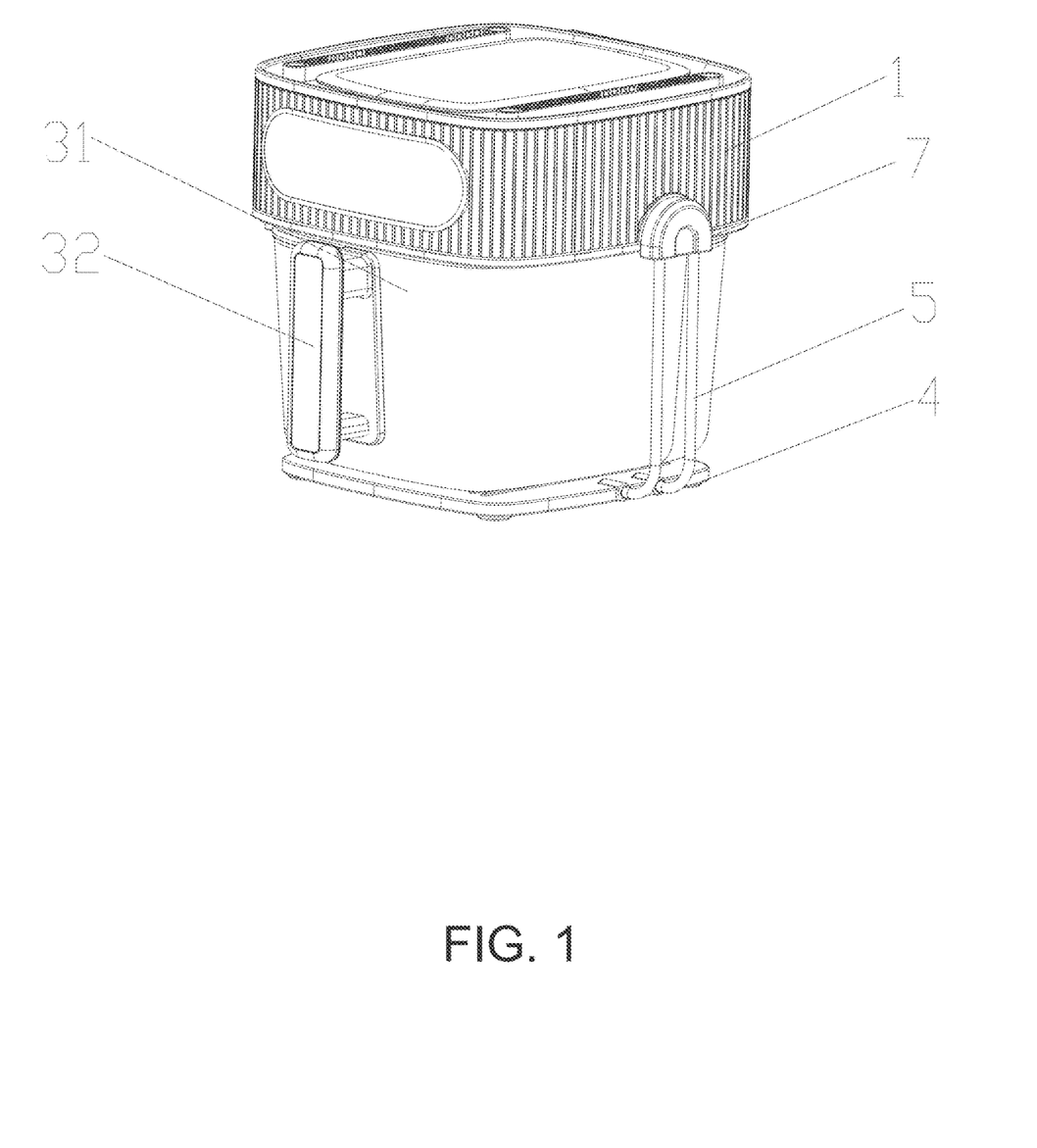
FIG. 1 is a structural schematic diagram of an air fryer.
Figure 2:
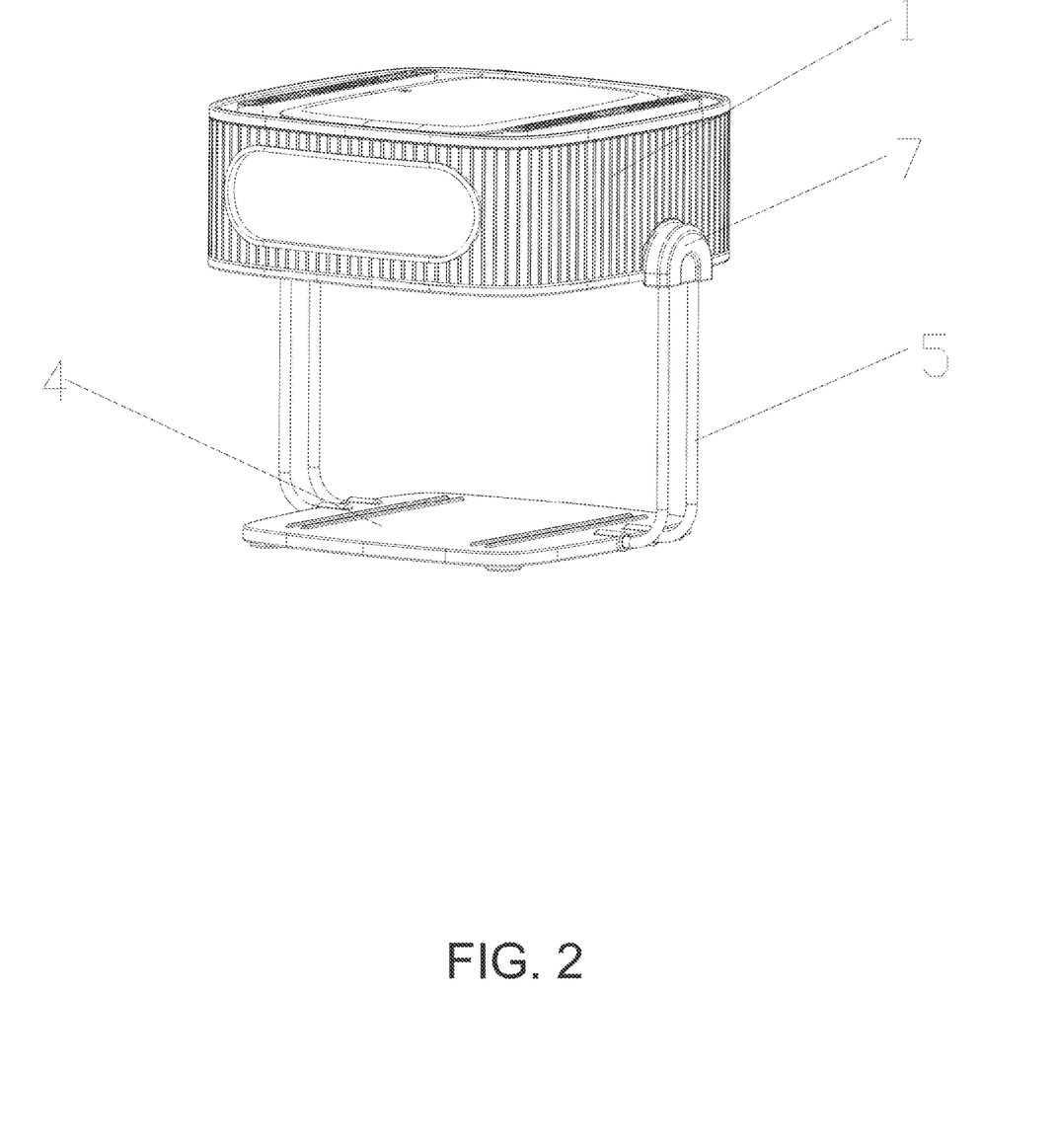
FIG. 2 is a structural schematic diagram of an air fryer with the fryer removed.
Figure 3:
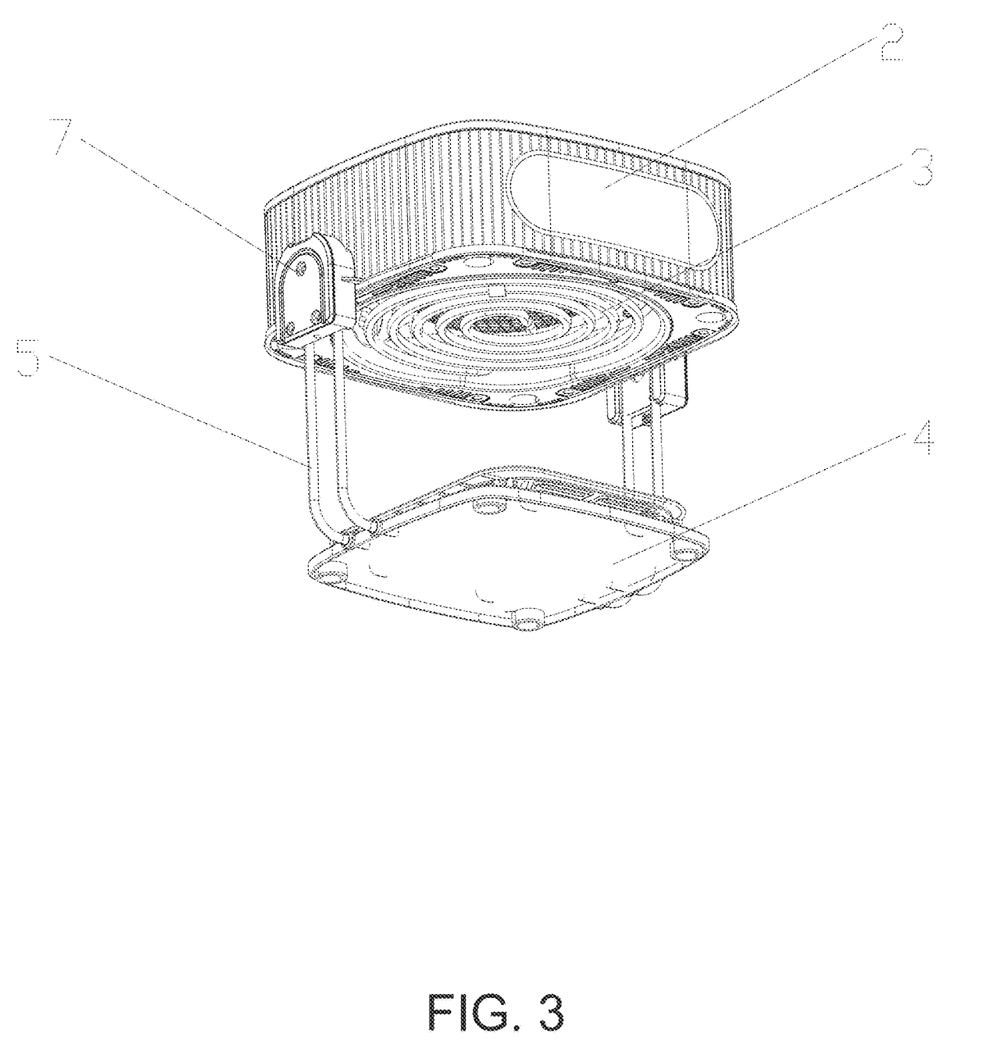
FIG. 3 is a structural schematic diagram from another perspective of an air fryer with the fryer removed.

As shown in FIG. 1, in this embodiment, the pot is a fryer 31; when the heating tube 3 of the heating assembly 1 faces downwards, the fryer 31 is placed between the fryer body 2 and the base 4 for deep-frying food. In this structure, when the heating tube 3 of the heating assembly 1 faces downwards, the fryer 31 is placed between the fryer body 2 and the base 4, and a food product is placed in the fryer 31 to achieve a pan-frying or deep-frying function.

Figure 4:
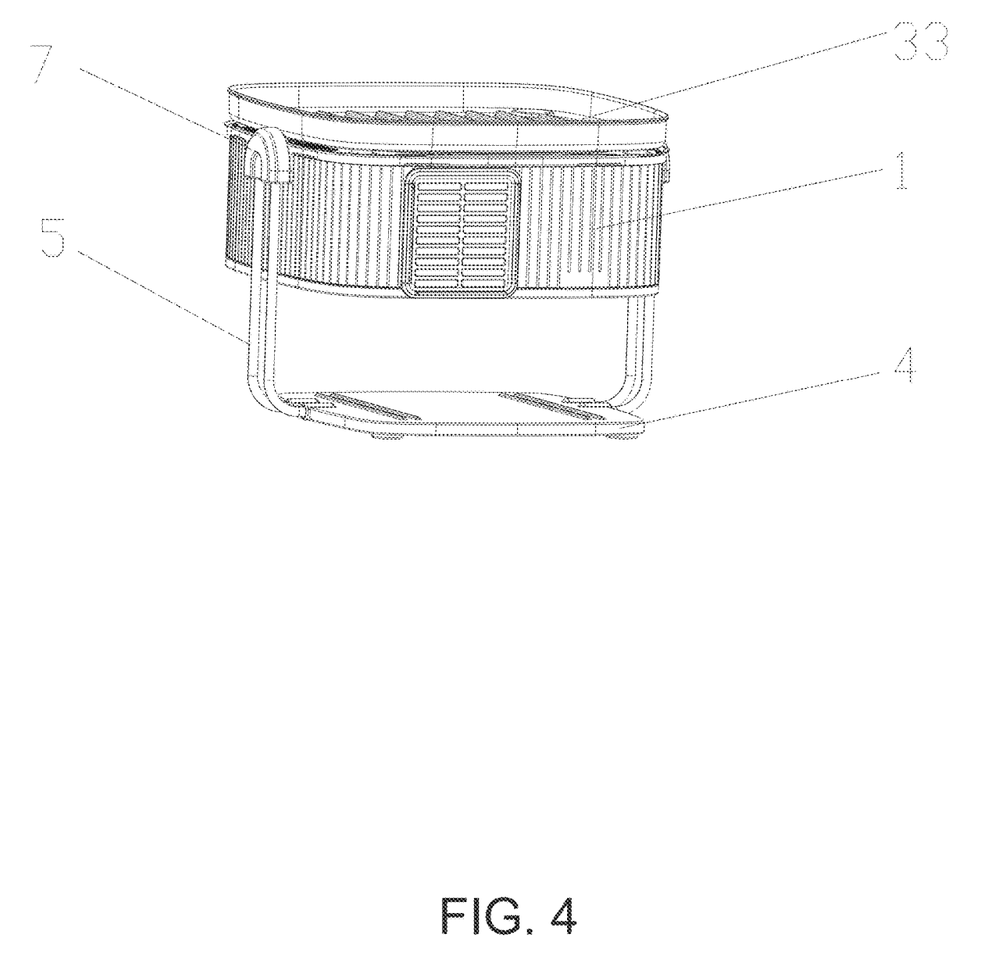
FIG. 4 is a structural schematic diagram of an air fryer heating assembly rotating 180° to place the frying pan.
Figure 5:
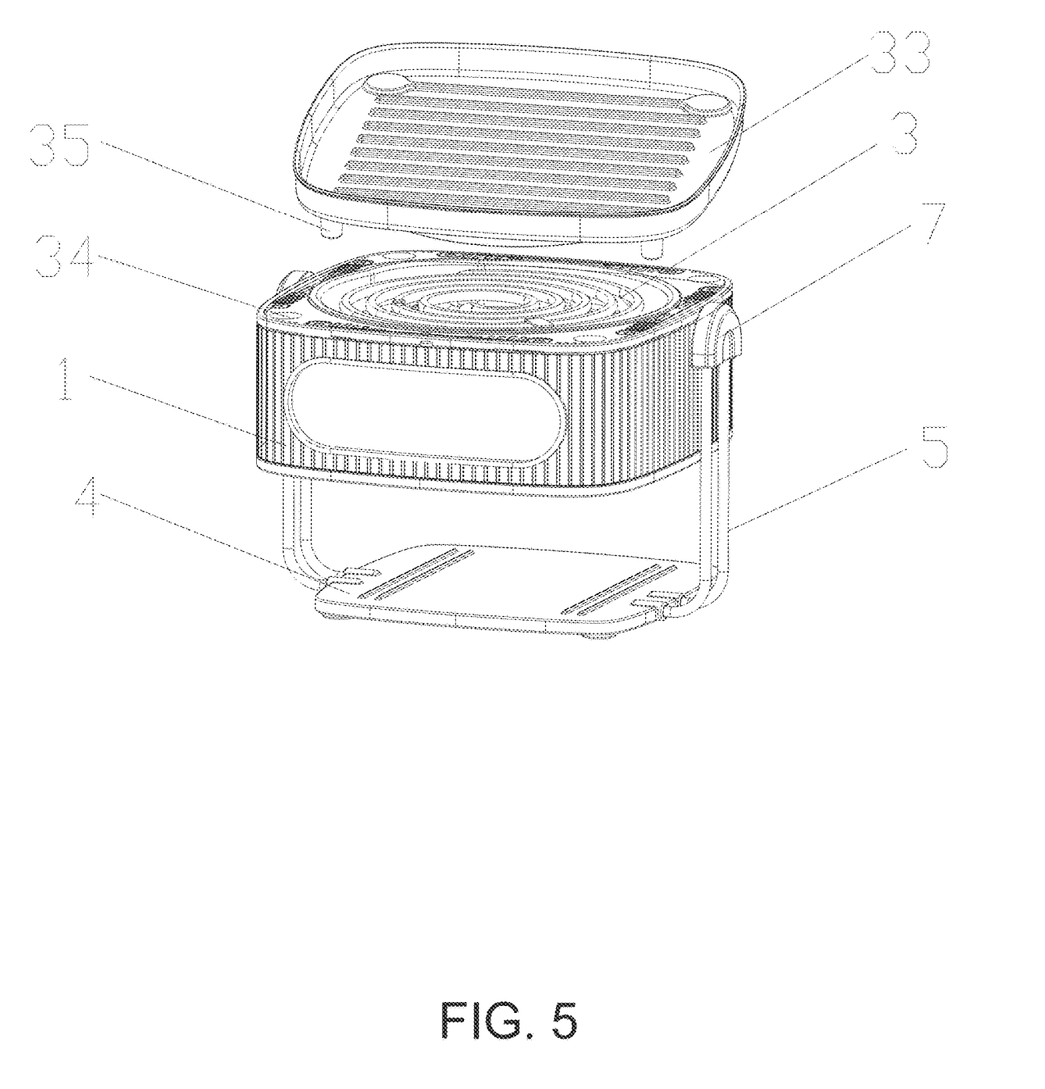
FIG. 5 is a structural schematic diagram of a heating assembly of the air fryer after rotating 180°.
Figure 6:
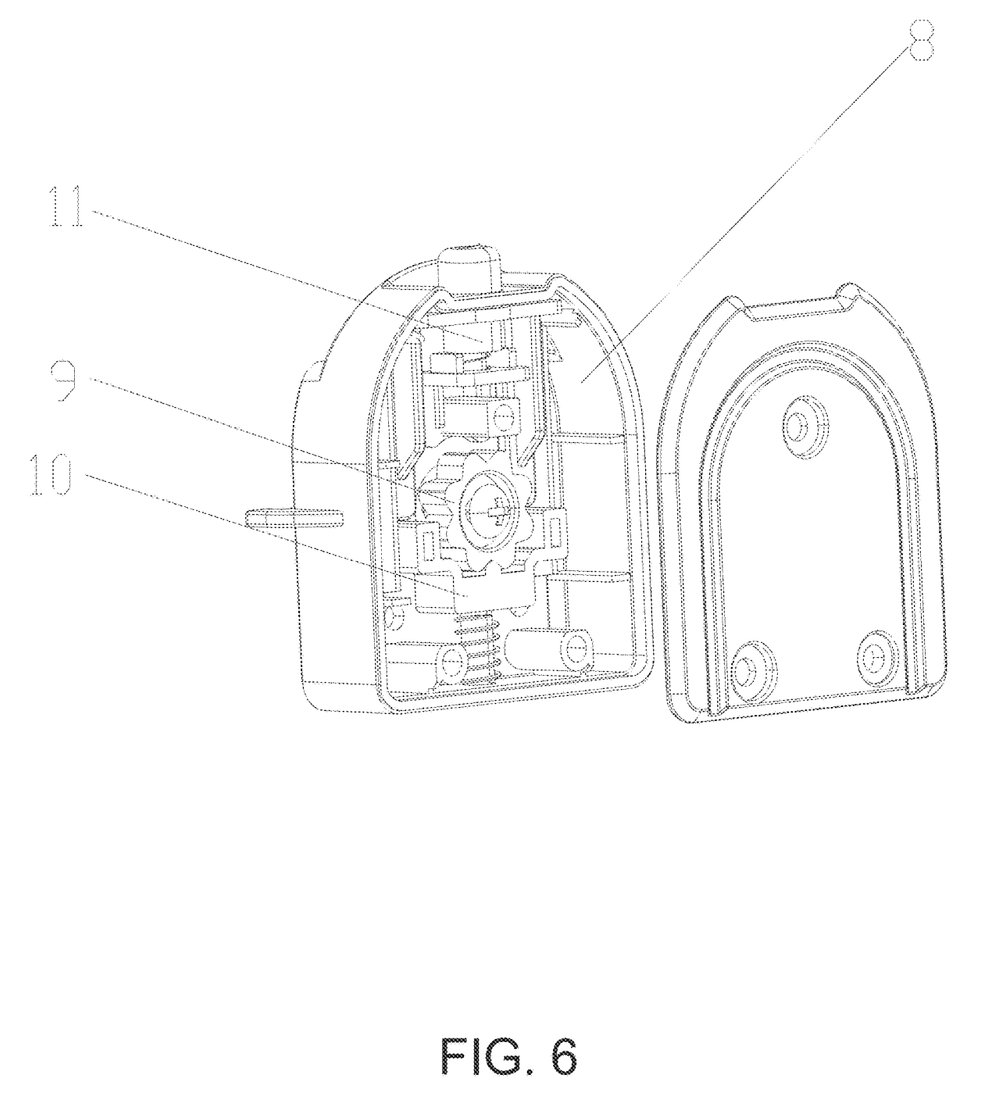
FIG. 6 is a structural schematic diagram of a rotating assembly.
Figure 7:
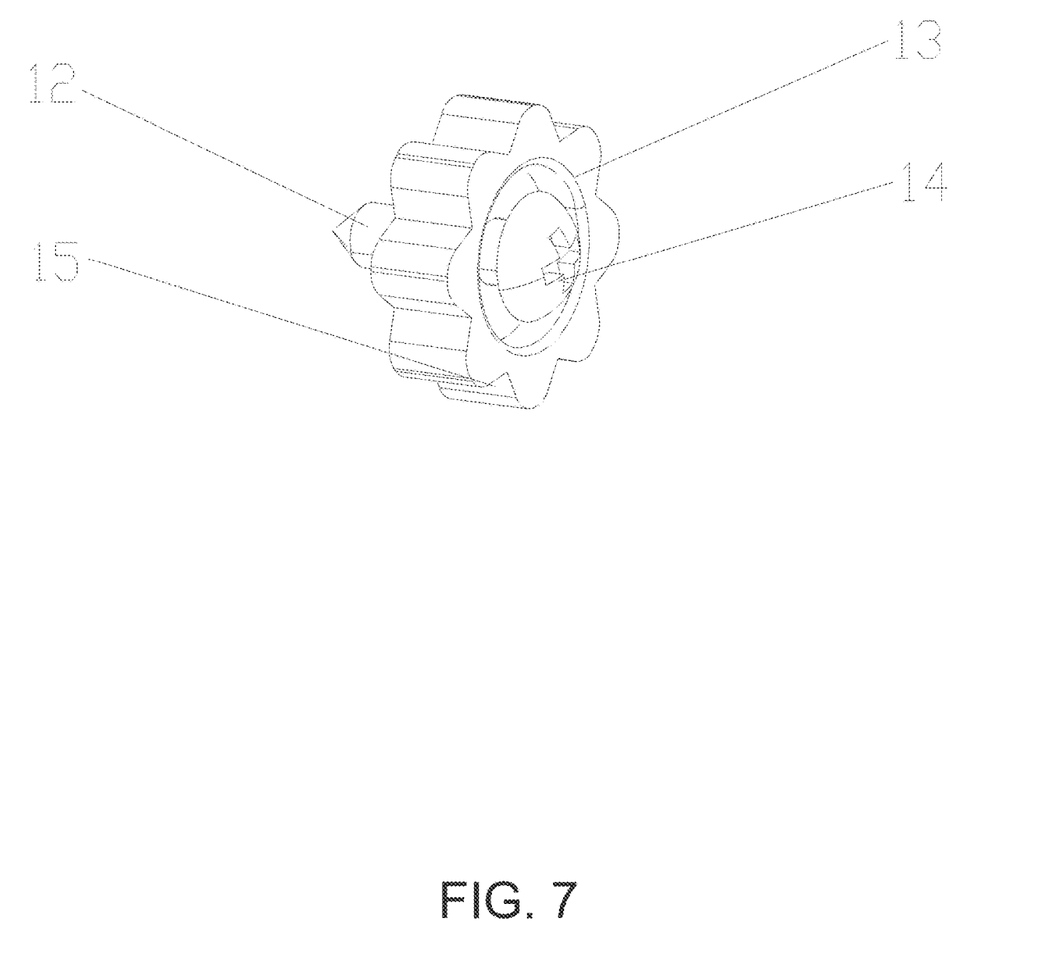
FIG. 7 is a structural schematic diagram of a rotating module.
Figure 8:
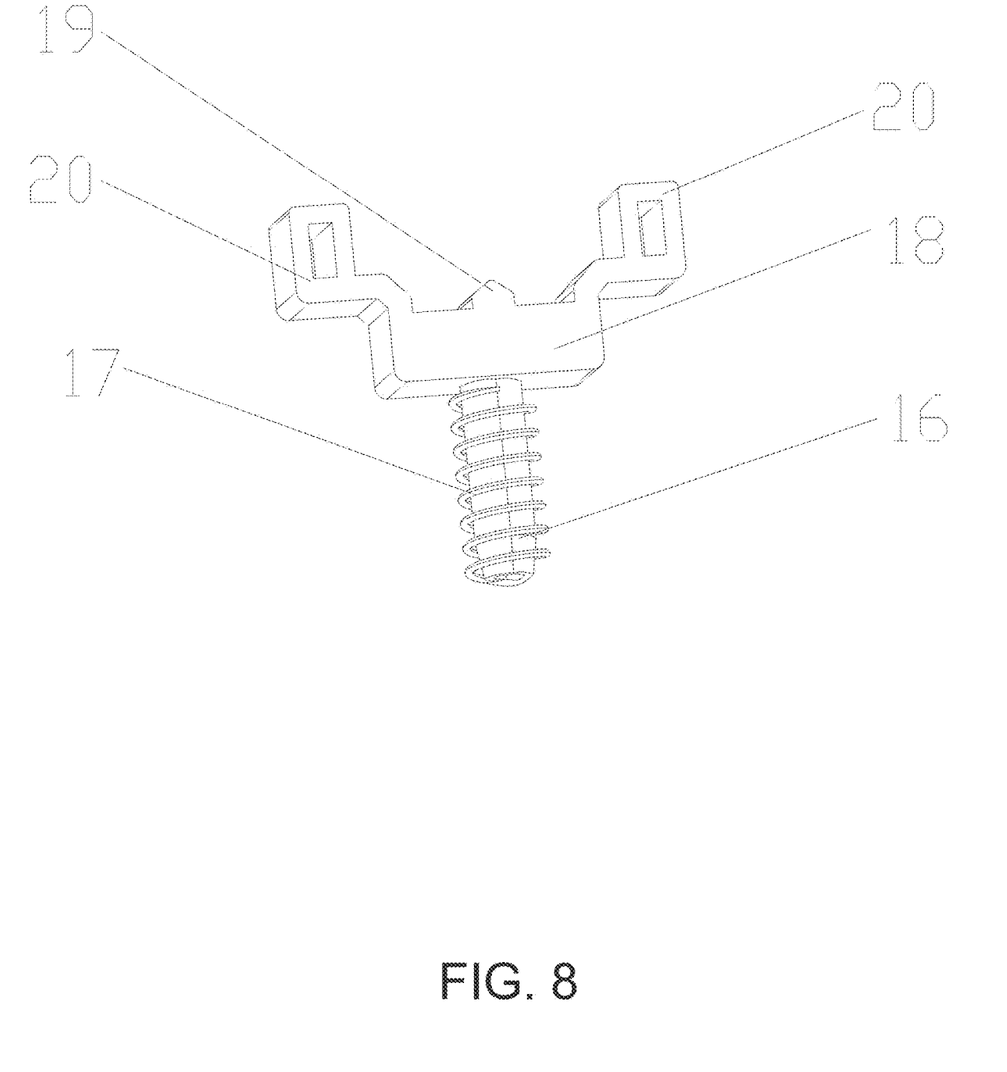
FIG. 8 is a structural schematic diagram of a clamping module.
Figure 9:
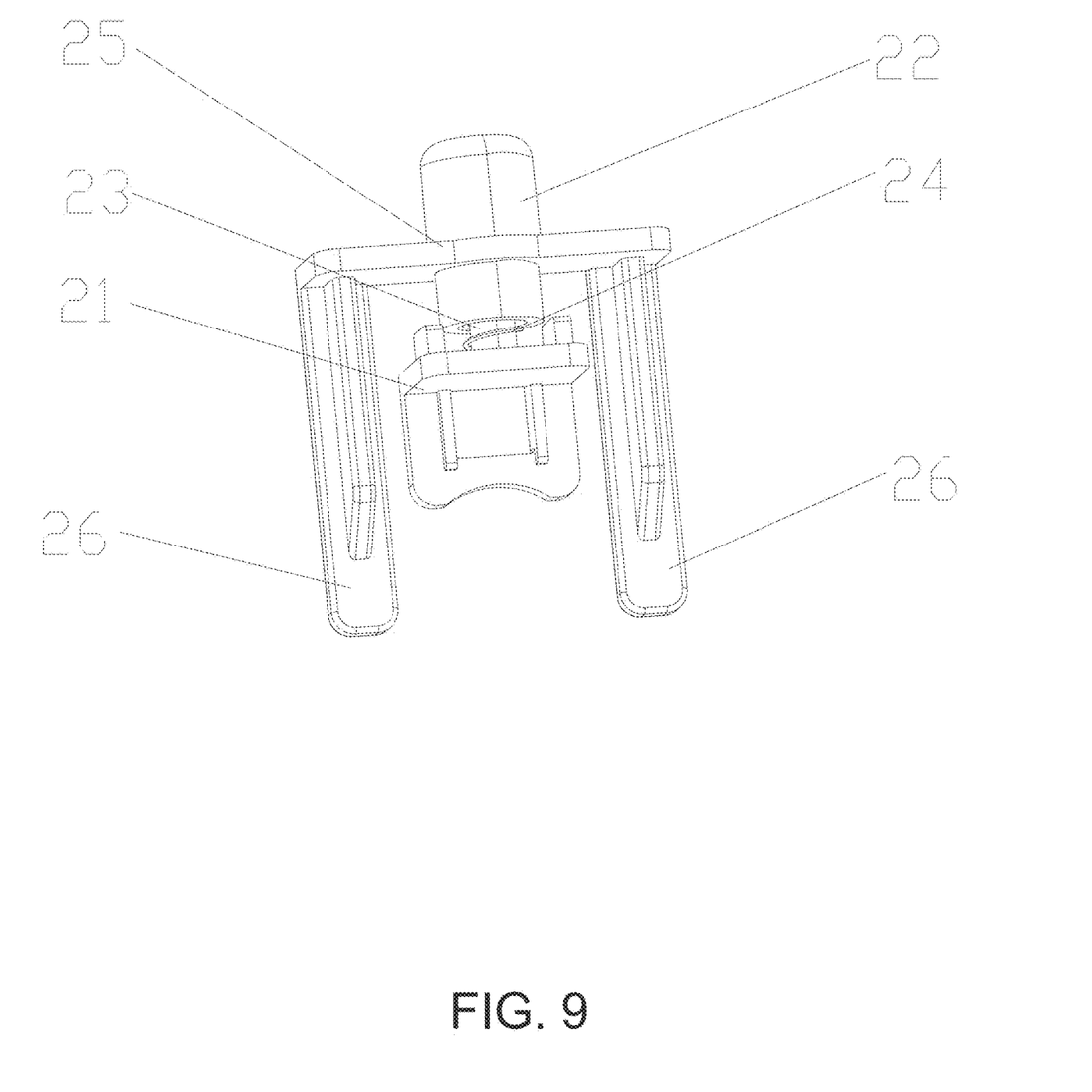
FIG. 9 is a structural schematic diagram of a pressing bar module.
Figure 12:
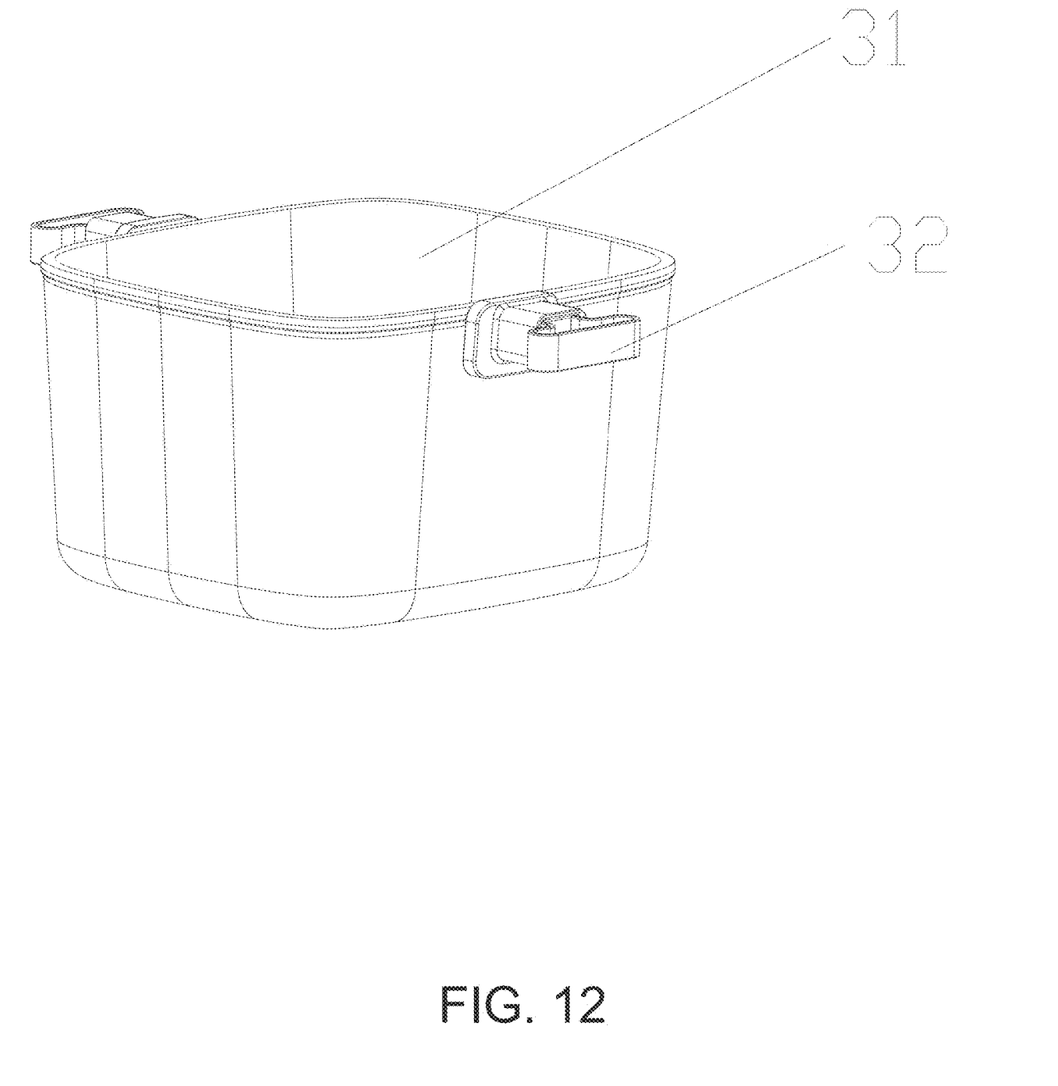
FIG. 12 is a structural schematic diagram of another embodiment of the fryer.

As shown in FIG. 1, in this embodiment, the material of the fryer 31 is metal or tempered glass. The fryer 31 is provided with a handle 32. As shown in FIG. 12, as another embodiment, the fryer is provided with two handles As shown in FIGS. 4-5, in this embodiment, the pot is a frying pan 33. When the heating assembly 1 rotates the heating tube 3 upwards by means of the rotating assembly 7, the frying pan 33 is placed above the heating tube 3 for decocting and boiling food. In this structure, when the heating assembly 1 rotates the heating tube 3 upwards by means of the rotating assembly 7, the frying pan 33 is placed above the heating tube 3, and a food product is placed in the frying pan 33 to achieve a decocting and boiling function.

As shown in FIGS. 4-5, in this embodiment, the housing 27 is provided with a plurality of jacks 34, a bottom of the frying pan 33 is provided with a plurality of plug rods 35 corresponding to the jacks 34, and the frying pan 33 is plugged into the jacks 34 of the housing 27 by means of the plug rods 35. In this structure, the frying pan 33 is plugged into the jacks 34 of the housing 27 by means of the plug rods 35 to ensure that the frying pan 33 is firmly fixed and effectively prevents the frying pan 33 from falling off when decocting and boiling food.

The specific embodiments described herein are merely illustrative of the spirit of the present invention. Those skilled in the art of this present invention can make various modifications or supplements to the described specific embodiments or replace them in similar ways, but they will not deviate from the spirit of this present invention or go beyond the scope defined by the appended claims.

What is claimed is:

1. A multifunctional air fryer, comprising:
    a heating assembly (1), wherein the heating assembly (1) comprises a fryer body (2) and a heating tube (3), and the heating tube (3) is installed on a surface of the fryer body (2), and wherein the heating assembly (1) further comprises a housing (27), a top cover (28) and a mounting base (29); the mounting base (29) is installed in the housing (27); the mounting base (29) is used for installing electrical appliance control components; the heating tube (3) is installed on the mounting base (29); the top cover (28) is fixed on a surface of the housing (27) away from the heating tube (3);
    a base (4), wherein the base (4) is located below the heating assembly (1), and the base (4) and the heating assembly (1) are provided with supporting rods (5);
    a rotating assembly (7), wherein the rotating assembly (7) is installed between the supporting rod (5) and the heating assembly (1), the heating assembly (1) is rotatably connected to the rotating assembly (7), and the supporting rod (5) is fixedly connected to the rotating assembly (7); and
    a pot, wherein a pot can be placed between the heating assembly (1) and the base (4) when the heating tube (3) of the heating assembly (1) faces downwards; and a pot can be placed above the heating tube (3) when the heating assembly (1) rotates the heating tube (3) upwards by means of the rotating assembly (7).

2. The multifunctional air fryer according to claim 1, wherein the rotating assembly (7) comprises a case (8), a rotating module (9), a clamping module (10) and a pressing bar module (11), and the rotating module (9), the clamping module (10) and the pressing bar module (11) are all installed in the case (8);
    the rotating module (9) comprises a connecting shaft (12), a rotating wheel (13) and a rotating shaft (14), a plurality of slots (15) are arranged on the periphery side of the rotating wheel (13), one end of the connecting shaft (12) is fixedly connected with the rotating wheel (13), and the other end of the connecting shaft (12) passes through the case (8) and is fixedly connected with the fryer body (2);

the clamping module (10) comprises a bottom rod (16), a first spring (17) and a clamping block (18), wherein a sliding hole is arranged on the clamping block (18); one end of the bottom rod (16) is fixed on the case (8), and the other end of the bottom rod (16) is slidably connected in a sliding hole; a clamp (19) is arranged on the clamping block (18), and the clamp (19) is clamped on the slot (15), the first spring (17) passes through the bottom rod (16), one end of the first spring (17) abuts against the case (8), and the other end of the first spring (17) abuts against a lower side surface of the clamping block (18); raised parts (20) are arranged on both sides of the clamping block (18); and the pressing bar module (11) comprises a bearing platform (21), a pressing bar (22), a connecting rod (23), a second spring (24) and a connecting block (25); the bearing platform (21) is fixed in the case (8), a through hole is arranged on the case (8), a cylindrical hole is arranged in the pressing bar (22), one end of the connecting rod (23) is fixed on the bearing platform (21), and the other end of the connecting rod (23) extends into the cylindrical hole and is slidably connected with the pressing bar (22), the second spring (24) passes through the connecting rod (23), one end of the second spring (24) abuts against the bearing platform (21), and the other end of the second spring (24) abuts against a bottom of the pressing bar (22); the connecting block (25) is located in the case (8) and fixedly connected to the pressing bar (22), and both ends of the connecting block (25) are provided with ejector rods (26) corresponding to the raised parts (20).

3. The multifunctional air fryer according to claim 2, wherein the first spring (17) and the second spring (24) are both springs compressed.

4. The multifunctional air fryer according to claim 1, wherein the housing (27) is provided with an air outlet (30).

5. The multifunctional air fryer according to claim 1, wherein the pot is a fryer (31); when the heating tube (3) of the heating assembly (1) faces downwards, the fryer (31) is placed between the fryer body (2) and the base (4) for deep-frying food.

6. The multifunctional air fryer according to claim 5, wherein a material of the fryer (31) is metal or tempered glass.

7. The multifunctional air fryer according to claim 5, wherein the fryer (31) is provided with a handle (32).

8. The multifunctional air fryer according to claim 1, wherein the pot is a frying pan (33), and when the heating assembly (1) rotates the heating tube (3) upwards by means of the rotating assembly (7), the frying pan (33) is placed above the heating tube (3) for decocting and boiling food.

9. The multifunctional air fryer according to claim 8, wherein the housing (27) is provided with a plurality of jacks (34), a bottom of the frying pan (33) is provided with a plurality of plug rods (35) corresponding to the jacks (34), and the frying pan (33) is plugged into the jacks (34) of the housing (27) by means of the plug rods (35).

\* \* \* \* \*